3,133,925
Patented May 19, 1964

3,133,925
ETHER DERIVATIVES OF N-BENZHYDRYL-N'-DI-HYDROXYPROPYLPIPERAZINES AND HOMO-PIPERAZINES
John W. Cusic, Skokie, Ill., assignor to G. D. Searle & Co., Chicago, Ill., a corporation of Delaware
No Drawing. Filed Dec. 22, 1960, Ser. No. 77,498
9 Claims. (Cl. 260—268)

The present invention relates to ether derivatives of N-benzhydryl - N' - dihydroxypropylpiperazines and homo-piperazines and more particularly to a group of compounds which can be represented by the following general formula

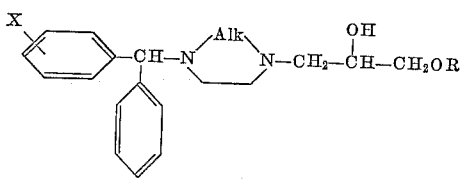

In this formula, X is a member of the class consisting of hydrogen and halogen; Alk is a member of the class consisting of ethylene and trimethylene; and R is a member of the class consisting of lower alkyl, lower alkenyl, phenyl, tolyl and halophenyl. Thus, the radical R can be methyl, ethyl, propyl, straight-chain or branched butyl, straight-chain or branched pentyl, allyl, methallyl, phenyl, tolyl and halophenyl.

The organic bases of this invention form pharmaceutically acceptable salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide and crotyl bromide.

The compounds of this invention can be prepared by heating a benzhydrylpiperazine of the formula

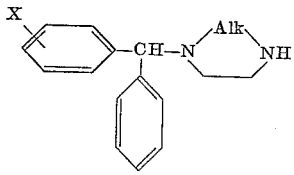

with a compound of the formula

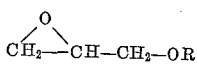

where X, Alk and R are defined as above.

The compounds of this invention are valuable because of their pharmacological effects. Specifically, they are inhibitors of hepatic cholesterol synthesis. They have the power to inhibit incorporation of mevalonic acid into non-saponifiable cholesterol precursors. They reduce biliary cholesterol and cholic acid concentration and excretion. These compounds are also appetite inhibitors. They also show antihypertensive activity.

The following examples are presented to further illustrate the invention; they should not be construed as limiting it in spirit or scope. Quantities are indicated in parts by weight and temperatures are in degrees centigrade (° C.).

Example 1

A solution of 12 parts of N-benzhydrylpiperazine and 20 parts of 1,2-epoxy-3-(2-chlorophenoxy)propane in 81 parts of butanone is refluxed for 12 hours. The mixture is added to a solution of 12 parts of maleic acid in isopropyl alcohol. On cooling there precipitates N-benzhydryl - N'-[3 - (2-chlorophenoxy)-2-hydroxypropyl]piperazine dimaleate melting at about 155–156° C. This compound has the following formula

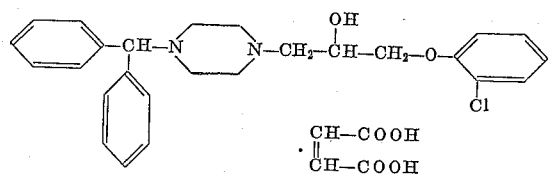

Example 2

By following the procedure of Example 1 and reacting N-benzhydrylpiperazine with the appropriate 1,2-epoxy-3-alkoxypropane, the following compounds are obtained:

N - benzhydryl-N'-(3 - methoxy-2-hydroxypropyl)piperazine dimaleate melting at about 140–141° C.

N - benzhydryl - N' - (3-ethoxy-2-hydroxypropyl)piperazine dimaleate melting at about 131–132° C.

N - benzhydryl-N'-(3-propoxy-2-hydroxypropyl)piperazine dimaleate melting at about 137–139° C.

N - benzhydryl-N'-(3 - butoxy-2-hydroxypropyl)piperazine dimaleate melting at about 153–154° C.

N - benzhydryl - N' - (3-isobutyoxy-2-hydroxypropyl)piperazine dimaleate melting at about 148–149° C.

N - benzhydryl - N' - (3 - pentyloxy-2-hydroxypropyl)piperazine dimaleate melting at about 142–143° C.

N - benzhydryl - N' - (3-isopentyloxy-2-hydroxypropyl)piperazine dimaleate melting at about 151–152° C.

N - benzhydryl-N'-(3 - methallyloxy-2-hydroxypropyl)piperazine dimaleate.

N - benzhydryl-N'-(3-allyloxy-2-hydroxypropyl)piperazine dimaleate melting at about 121–123° C.

Example 3

By following the procedure of Example 1 and reacting N-benzhydrylpiperazine with the appropriate 1,2-epoxy-3-aryloxypropane, the following compounds are obtained:

N - benzhydryl-N'-(3-phenoxy-2-hydroxypropyl)piperazine dimaleate.

N - benzhydryl - N' - [3-(4-chlorophenoxy)-2-hydroxypropyl]piperazine dimaleate melting at about 154–155° C.

N - benzhydryl-N'-[3-(2 - methylphenoxy)-2-hydroxypropyl]piperazine dimaleate melting at about 148–150° C.

N - benzhydryl-N'-[3-(3 - methylphenoxy)-2-hydroxypropyl]piperazine dimaleate melting at about 159–160° C.

Example 4

A mixture of 7 parts of N-(4-chlorobenzhydryl)piperazine and 4 parts of 1,2-epoxy-3-isopentyloxypropane in 20 parts of butanone is refluxed for 4 hours. The resultant solution is added to a solution of 6 parts of maleic acid in 40 parts of isopropyl alcohol. On cooling there precipitates N - (4 - chlorobenzhydryl)-N'-(2-hydroxy-3-isopentyloxypropyl)piperazine dimaleate melting at about 140–142° C.

Example 5

A mixture of 7 parts of N-(4-chlorobenzhydryl)piperazine and 6 parts of 1,2-epoxy-3-(4-chlorophenoxy)propane in 79 parts of isopropyl alcohol is refluxed for 6 hours. At the end of the reflux period, a solution of 12 parts of maleic acid in isopropyl alcohol is added. Cooling gives a precipitate which is recrystallized from dilute isopropyl alcohol to yield N-(4-chlorobenzhydryl)-N'-[2-hydroxy-3-(4-chlorophenoxy)propyl]piperazine dimaleate melting at about 131–132° C.

By substituting the appropriate 4-halobenzhydrylpiperazines and 1,2-epoxy-3-halophenoxypropanes for the corresponding compounds in the above procedure, the following compounds are obtained:

N - (2 - fluorobenzhydryl)-N'-[2-hydroxy-3-(4-fluorophenoxy)propyl]piperazine dimaleate.

N - (2 - iodobenzhydryl)-N'-[2-hydroxy-3-(4-iodophenoxy)propyl]piperazine dimaleate.

*Example 6*

A mixture of 7.5 parts of N-(4-chlorobenzhydryl) homopiperazine and 4 parts of 1,2-epoxy-3-isopentyloxypropane in 40 parts of butanone is refluxed for 4 hours and then added to a solution of 6 parts of maleic acid in isopropyl alcohol. The solution is concentrated and ether is added to the point of incipient precipitation. Cooling yields N - (4 - chlorobenzhydryl) - N' - (2-hydroxy-3-isopentyloxypropyl)homopiperazine dimaleate melting at about 106–108° C.

What is claimed is:
1. A compound of the formula

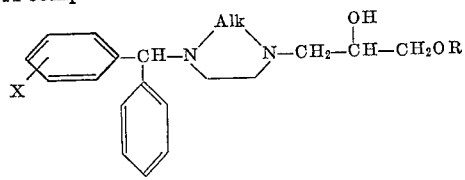

wherein X is a member of the class consisting of hydrogen and halogen; Alk is a member of the class consisting of ethylene and trimethylene; and R is a member of the class consisting of lower alkyl, lower alkenyl, phenyl, tolyl and halophenyl.

3. N - benzhydryl - N' - (3-methoxy-2-hydroxypropyl) piperazine.

4. N - benzhydryl - N' - (3 - butoxy-2-hydroxypropyl) piperazine.

5. A compound of the formula

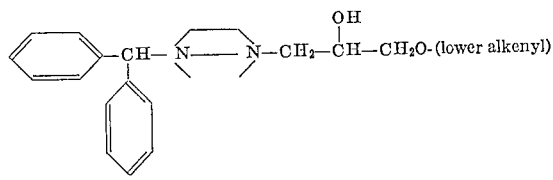

6. N - benzhydryl - N' - (3-allyloxy-2-hydroxypropyl) piperazine.

7. A compound of the formula

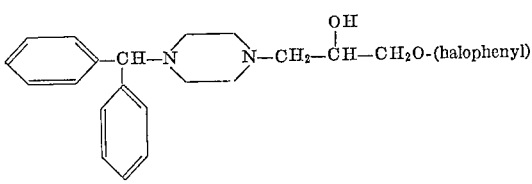

8. N - benzhydryl - N' - [3 - (2 - chlorophenoxy)-2-hydroxypropyl]piperazine.

9. N - (4 - chlorobenzhydryl)-N'-(3-isopentyloxy-2-hydroxypropyl)piperazine.

References Cited in the file of this patent

UNITED STATES PATENTS 2,575,122    Pollard _____ Nov. 13, 1951
2,899,436    Morren _____ Aug. 11, 1959